United States Patent Office 3,095,824
Patented July 2, 1963

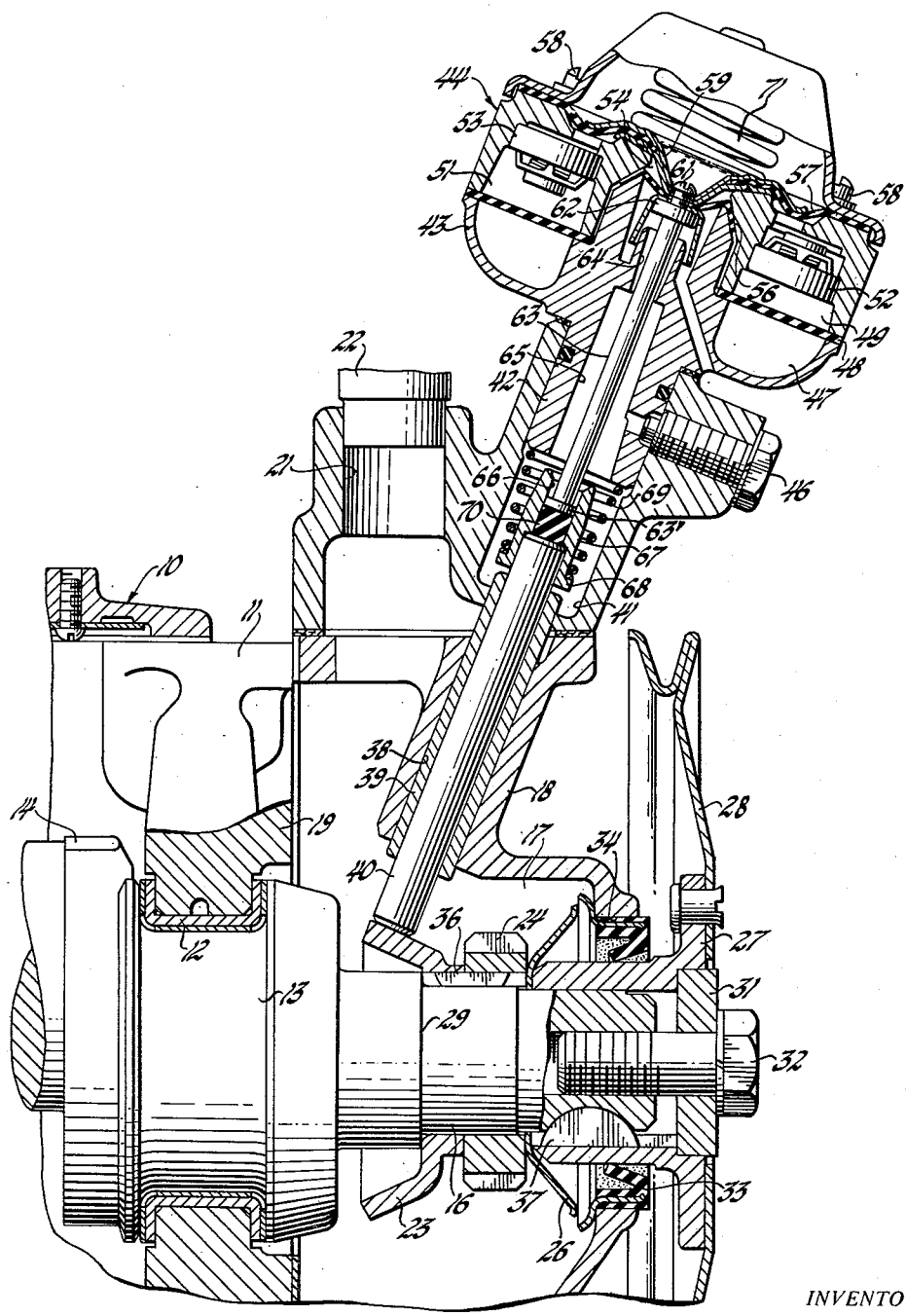

3,095,824
FUEL PUMP DRIVE
Donald B. Elfes, Royal Oak, Mich., assignor to General Motors Corporation, Detroit, Mich., a corporation of Delaware
Filed June 13, 1960, Ser. No. 35,678
3 Claims. (Cl. 103—152)

This invention relates to improvements to fuel pump drive means for internal combustion engines disclosed and claimed in application Serial Number 840,677, entitled "Fuel Pump Drive," filed September 17, 1959 by Adelbert E. Kolbe. It is especially applicable for driving a fuel pump from a crankshaft of an internal combustion engine to be used for automotive and other purposes.

In the above noted application, it was proposed to drive a fuel pump from the crankshaft of a four stroke cycle internal combustion engine, which runs at twice the speed of the camshaft. To do this it was proposed to provide a short stroke fuel pump and to proportionally reduce the stroke of the drive for the fuel pump. The drive was directly aligned with the reciprocating shaft of the fuel pump and could be positioned in oblique relation to the axis of the crankshaft of the engine. The fuel pump was also removable from the engine with or without removing the drive.

It has been found that in the operation of the fuel pump drive of the application referred to above, a clicking noise is experienced during engine idle conditions by reason of the push rod momentarily engaging and disengaging the drive cam and that at times the clicking noise also resulted from the momentary engagement and disengagement of the pump reciprocating shaft with the coupling between that shaft and the push rod. The improvements which are the subject of this invention provide means for silently absorbing the engaging forces so that the objectionable noises are eliminated. This is an important feature in passenger vehicles since all extraneous noises detract from the product.

In the drawing:

The single FIGURE of the drawing is a fragmentary view of one end of an internal combustion engine with a fuel pump drive embodying the invention mounted in oblique relation to the axis of the crankshaft of the engine.

The engine 10 has a frame 11 in which bearings 12 are provided for supporting the journals 13 of the crankshaft 14 of the engine 10. The crankshaft 14 has an end 16 that projects into a cavity 17 in a housing 18 that forms a part of the frame 11 and is removably secured to a front end wall 19 by bolts or other suitable means, not shown. The cavity 17 has an inlet 21 in which a filler tube 22 may be secured for filling with oil the crankcase of the engine communicating with the cavity 17. The end 16 supports a cam 23, which may if desired be of conical formation and supports a gear 24 which may be employed in operating a distributor and lubricating oil pump, also not shown. Beyond the gear 24 is an oil slinger 26 and a hub 27 employed in driving a pulley 28 for driving the engine fan and other accessory apparatus, not shown. The hub 27, the slinger 26, the gear 24 and the cam 23 all may be secured against a shoulder 29 formed on the shaft end 16 by employing a collar 31 secured in the hub 27 by a bolt 32 which is threaded into an opening in the end of the shaft end 16. A seal 33 is employed adjacent the outer edge of the slinger 26 and is press fitted into an opening 34 formed in the housing 18 around the hub 27. The cam 23, the gear 24 and the hub 27 may be keyed to the shaft end 16 as is indicated at 36 and 37.

The housing 18 may be formed to provide a push rod guide 38 which may have an insertable guide sleeve indicated at 39. The guide 38 is adapted to receive a reciprocating push rod 40, the inner end of which is normally disposed on the surface of the cam 23. The push rod 40 is disposed in the plane of the axis of rotation of the crankshaft 14 and in alignment with a socket or cavity 41 formed in the exterior surface of the housing 18. Secured in the outer end of the cavity 41 is the cylindrical shank 42 of the casing 43 of a fuel pump 44 for the engine 10. The fuel pump casing 43 may be removably secured in the cavity 41 by operation of a set screw 46. The fuel pump 44 has the usual pressure equalizing chamber 47 separated by diaphragm 48 from the inlet and exhaust chambers of the pump 49 and 51 respectively. The pump has inlet and exhaust valves 52 and 53 respectively that control the flow of fuel in the pumping chamber 54 that is formed by the diaphragms 56 and 57. The diaphragms 56 and 57 are secured between the separable sections of the pump casing 43 by operation of the screws 58. The middle of the diaphragm 57 is secured by plates 59 and a bolt 61 to the enlarged end 62 of a reciprocating drive shaft 63. The drive shaft 63 is mounted in the casing 43 on a shaft guide indicated at 64. The inner end of the shaft 63 projects through a cavity 65 in the shank 42 and into a part of the cavity 41 that extends beyond the shank 42. The inner end of the shaft 63 has an enlarged head 63' which is adapted to be seated in a cylinder or recess 66 that is formed in the end of a coupling 67 that is press fitted on the outer end of the push rod 40. The recess 66 is aligned with the shafts 63 and 40. The coupling 67 has a flange 68 adapted to engage the end of a spring 69 which is normally compressed against the inner end of the cylindrical shank 42. A non-metallic element or resilient plug 70 formed of synthetic rubber or other suitable material is received in the bottom of recess 66 so that the head 63' of pump drive shaft 63 is engageable therewith. The forces exerted by the push rod 40 and drive shaft 63 are transmitted through plug 70 and that plug absorbs the engaging forces and effectively eliminates the objectionable clicking noises. The spring 69 acting through the flange 68 of coupling 67 maintains the push rod 40 in engagement with the face of cam 23 so that no clicking noises are generated by engagement and disengagement of push rod 40 with cam 23. The pump main actuating spring 71 tends to compress the plates 59 carrying the diaphragm 57 for displacing fuel from the pump chamber 54 and through the exhaust valve 53. The cam 23 tends to move the shaft 40 against the springs 71 and 69 thus concurrently moving shaft 63 upwardly for drawing fuel through the inlet valve 52 and into the pumping chamber 54. When the engine is idling there is a demand for less fuel by the carburetor than the full capacity of the pump. This reduced demand causes a temporary and partial hydraulic lock between the inlet valve 52 and the carburetor. When this occurs, chamber 54 tends to fill with fuel and diaphragms 56 and 57 are urged toward their intake or maximum stroke position thus tending to compress the spring 71 to hold the shaft 63 outwardly of the recess 66 in the socket 67. The spring 69 will tend to cause the shaft 40 to follow the cam 23 and to move the shaft head 63' away from the plug 70. This will cause the pump to operate at the stroke which is less than the lift of the cam 23 to deliver a reduced quantity of fuel when there is a reduced demand for fuel. This may occur for example when the motor vehicle with which the engine 10 may be employed is running down hill and driving the engine at no load. Thus the engaging forces between shaft 40 or socket 67 and shaft head 63' will be cushioned and the clicking noises obtained by the earlier structure will be eliminated.

What is claimed is:
1. In a fuel pump drive for an internal combustion engine having an engine frame and a rotating shaft mounted in said frame and a fuel pump removably mounted on said frame, an axial passage in said frame extending from an exterior surface thereof to a position adjacent said rotating shaft, said fuel pump mounted at the exterior opening of said passage and having a reciprocating drive shaft aligned with and extending into said passage and being variably positionable by the fuel pump from a maximum stroke position to a minimum stroke position in accordance with fuel demand, the improvement comprising a cam adapted to be mounted on the engine rotating shaft, a push rod adapted to be reciprocably mounted within the lower portion of said passage and operatively engaging said cam and extending between said cam and the end of the fuel pump reciprocating drive shaft to variably reciprocate same in response to the operation of said cam according to the combined effect thereon of said fuel pump and cam, a spring supported by the walls of said passage and acting on said push rod to constantly urge same solidly against said cam, said push rod and reciprocating drive shaft being separably engageable to permit the operation of the fuel pump at a stroke less than the lift of said cam when the reciprocating drive shaft is positioned other than at maximum stroke position, a coupling secured on the end of said push rod opposite said cam and having an axially disposed cylinder therein, said cylinder being adapted to reciprocally receive the inner end of said reciprocating drive shaft for guiding same, and a non-metallic element disposed between the separably engageable ends of said push rod and reciprocating drive shaft whereby said fuel pump is provided with a fuel pump drive practically free from operational noises.

2. A fuel pump adapted for mounting on an internal combustion engine and having a fuel pump drive adapted for operation from the engine crankshaft, said drive having a variable stroke reciprocating drive shaft, a diaphragm means in the fuel pump connected to one end of said reciprocating drive shaft to variably position said drive shaft according to fuel demand, a passage disposed in the engine in the plane of the axis of rotation of the crankshaft and aligned with said fuel pump drive to provide an opening to the crankshaft therefor, the improvement comprising a movable coupling axially disposed in said passage and having a cylindrical bore being adapted to reciprocally receive therein the other end of said reciprocating drive shaft, a spring supported by the walls of said passage and acting on said movable coupling biasing same in the direction of the crankshaft, a push rod reciprocably received in the lower portion of said passage and having one end connected to said coupling to impart a reciprocating motion thereto, said push rod end also providing a separably engageable contact with said drive shaft other end for imparting variable operative movement to said drive shaft, a non-metallic element disposed between the separably engageable ends of said push rod and drive shaft, and a cam mounted on the crankshaft for imparting reciprocable motion to said push rod, said push rod terminating beyond said passage and being constantly and solidly engageable with said cam whereby a fuel pump drive is obtained being practically free from operational noises.

3. A fuel pump including a fuel pump drive adapted for operation with an internal combustion engine having a frame and a crankshaft rotatably mounted therein, said frame having a socket formed in the external surface thereof and a passage aligned therewith leading from one end of said socket through said frame to the position adjacent said crankshaft, said fuel pump drive removably positioned in said socket and passage and including a reciprocating drive shaft adapted to project into said socket, one end of said reciprocating drive shaft connected to said pump and being variably positionable between a maximum and minimum stroke position in accordance with fuel demand, a movable coupling aligned with and terminating in said socket having an axial bore therein, said reciprocating drive shaft adapted to be reciprocally received in said bore, a spring supported by the walls of said socket and acting on said coupling to constantly urge same in the direction of said passage, a push rod aligned with and reciprocably received in said passage and extending therethrough, one end of said push rod being fixedly mounted to said coupling and providing a separable contact with the other end of said reciprocating drive shaft when said drive shaft is positioned other than at minimum stroke position for imparting variable operative movement to said drive shaft, a cam mounted on said crankshaft adjacent the other end of said push rod to impart reciprocal pumping motion thereto, said push rod being constantly urged into solid contact with said cam by said spring, and a resilient plug mounted in said coupling between the separable ends of said push rod and drive shaft, and said construction permitting the removal of said pump and reciprocating drive shaft to expose said push rod, coupling and spring, each being accessible in said socket and removable therefrom by movement of said push rod away from said cam and outwardly of said passage through said socket.

References Cited in the file of this patent

UNITED STATES PATENTS

| | | |
|---|---|---|
| 1,275,426 | Hogart | Aug. 13, 1918 |
| 2,018,111 | Babitch | Oct. 22, 1935 |
| 2,064,750 | Hurst | Dec. 15, 1936 |
| 2,094,171 | Hoffer | Sept. 28, 1937 |
| 2,305,540 | Lowther | Dec. 15, 1942 |
| 2,485,439 | Erickson | Oct. 18, 1949 |
| 2,633,084 | Lasley | Mar. 31, 1953 |
| 2,846,698 | Tomlinson | Aug. 12, 1958 |
| 2,929,332 | Pierce | Mar. 22, 1960 |
| 2,969,746 | Smith | Jan. 31, 1961 |

FOREIGN PATENTS

| | | |
|---|---|---|
| 464,734 | Great Britain | Apr. 23, 1937 |